United States Patent [19]
Ahmad et al.

[11] Patent Number: 5,506,308
[45] Date of Patent: Apr. 9, 1996

[54] PRECURE RETARDATION OF FREE RADICAL CURED ELASTOMERS

[75] Inventors: Mahfooz Ahmad, Kennesaw; Mark E. Terry, Rockmart, both of Ga.

[73] Assignee: Interface, Inc., LaGrange, Ga.

[21] Appl. No.: 420,370

[22] Filed: Apr. 11, 1995

[51] Int. Cl.$^6$ .................................................. C08F 8/42
[52] U.S. Cl. ........................................ 525/256; 525/274
[58] Field of Search ................................ 525/256, 274, 525/349

[56] References Cited

U.S. PATENT DOCUMENTS

| | | | |
|---|---|---|---|
| 3,751,378 | 8/1973 | Cowperthwaite et al. | 260/4 |
| 4,192,790 | 3/1980 | McKinstry et al. | 260/31.2 |
| 4,843,114 | 6/1989 | Touchet et al. | 524/87 |
| 4,857,571 | 8/1989 | Reiter et al. | 524/248 |
| 4,918,144 | 4/1990 | Fukuda | 525/263 |
| 4,983,678 | 1/1991 | Saito et al. | 525/193 |
| 4,990,570 | 2/1991 | Saito et al. | 525/254 |
| 5,208,294 | 5/1993 | Brown | 525/263 |
| 5,245,084 | 9/1993 | Groepper et al. | 526/226 |

FOREIGN PATENT DOCUMENTS

| | | |
|---|---|---|
| 0319320 | 6/1984 | European Pat. Off. . |
| 59-215347 | 12/1984 | Japan . |

*Primary Examiner*—Bernard Lipman
*Attorney, Agent, or Firm*—Jones & Askew

[57] ABSTRACT

A curable elastomer composition comprising an elastomer, an unsaturated carboxylic metal salt such as zinc diacrylate, an organic peroxide curing agent such as a ditertiary alkyl peroxide, and phenothiazine as a precure inhibitor. Suitable elastomers include nitrile rubber, EPDM, and EVA. The nitrile rubber is desirably hydrogenated. A method for curing the curable elastomer composition and the resulting cured elastomer compositions are encompassed.

29 Claims, No Drawings

PRECURE RETARDATION OF FREE RADICAL CURED ELASTOMERS

TECHNICAL FIELD

This invention relates to the curing or vulcanization of elastomers with free radical generating compounds, specifically, organic peroxides which are commonly known as vulcanization initiators. Elastomers curable with free radical generating compounds include nitrile butadiene rubber, ethylene-propylene diene copolymer (EPDM), and ethylene-vinyl acetate copolymer (EVA). More particularly, the present invention relates to the use of phenothiazine as a precure inhibitor in the curing of elastomer compositions comprising an unsaturated carboxylic metal salt as a reactive coagent in the cross-linking of such elastomers in the presence of organic peroxides.

BACKGROUND OF THE INVENTION

Elastomers are typically cured by first being compounded with a curing agent, processing agents, and other additives such as reactive coagents and fillers to form a masterbatch, and then being heated to temperatures at which curing occurs. Suitable curing agents for many elastomers include organic peroxides which produce free radicals in the elastomer masterbatch. The free radicals initiate cross-linking of the elastomer polymer chains to cure the elastomer. Processing aids are added to the masterbatch to reduce the viscosity of the masterbatch during compounding so that the curing agent and other additives can be thoroughly and rapidly dispersed in the elastomer.

Even with the addition of processing aids, some elastomers, such as nitrile rubber and EPDM, have a relatively high viscosity and must be compounded at relatively high temperatures so that the viscosity is low enough for thorough and rapid dispersion of the curing agent and other additives in the elastomer. High viscosity elastomers such as nitrile rubber are typically compounded at a temperature within the range from about 38° to about 130° C. and then cured at a temperature within the range from about 150° to about 205° C.

To form useful products, elastomers are typically formed into a useful shape, such as by injection molding, after compounding but before curing of the elastomer. High viscosity elastomers such as nitrile rubber must also be at a high temperature during formation into a useful shape.

Curing increases the viscosity of elastomer compositions. Thus, it is desirable to delay curing during compounding of an elastomer masterbatch to allow time for thorough dispersion of curing agents and other additives in the masterbatch. Likewise, it is desirable to delay curing during formation of the elastomer into a useful shape so that the shape can be completely formed with a reasonable amount of forming energy.

After compounding and formation are complete, it is desirable, in applications where relatively hard, strong rubber is desired, to cure the elastomer masterbatch rapidly and develop a high level of cross-linking and modulus in the rubber. Reactive coagents such as unsaturated carboxylic metal salts promote rapid curing of elastomers when organic peroxides are used as the curing agent and also enhance the cross-linking and modulus in the final product. Elastomers cured with organic peroxide curing agents and unsaturated carboxylic metal salt can have physical properties superior to elastomers cured with sulfur, but tend to precure (scorch) during compounding or formation. This has been a particular problem when using zinc diacrylate as the reactive coagent in the curing of elastomers such as nitrile rubber and EPDM, which require high compounding and formation temperatures. The unsaturated carboxylic metal salt tends to form free radicals at high compounding and formation temperatures.

Precure increases the viscosity of the masterbatch and can make compounding and formation more difficult. This can result in shriveling and lumpiness in the cured product. In extreme cases, precure can cause "freezing" of the masterbatch in the compounding, forming, and curing, apparatus. To solve this problem, precure inhibitors (also known as prevulcanization inhibitors or scorch retarders) have been developed, examples of which are disclosed in European Patent 319,320A and U.S. Pat. Nos. 4,843,114; 4,857,571; 4,918,144; 4,983,678; and 4,990,570. There remains, however, the need for a precure inhibitor that is relatively non-hazardous, does not diminish the physical properties of the elastomer, and is economical when used in elastomer compositions comprising an organic peroxide as the curing agent and an unsaturated carboxylic metal salt as a reactive coagent.

SUMMARY OF THE INVENTION

This invention fulfills the above described need by providing a curing system for elastomers comprising an elastomer, an organic peroxide curing agent, phenothiazine as a precure inhibitor, and an unsaturated carboxylic metal salt as a vulcanizate or cross-linking agent. The phenothiazine provides protection against scorch or prevulcanization of the elastomer and the unsaturated carboxylic metal salt during compounding. The present invention encompasses a curable elastomer composition, a method of curing the curable elastomer composition, and the resulting cured elastomer composition.

Desirably, the elastomer is a high viscosity elastomer such as nitrile rubber, EPDM, or EVA. The nitrile rubber is desirably hydrogenated and the unsaturated carboxylic metal salt desirably comprises zinc diacrylate. The organic peroxide curing agent is desirably a ditertiary alkyl peroxide such as 2,5-dimethyl- 2,5-di(t-butylperoxy)hexyne-3, calcium carbonate.

The method for curing the elastomer comprises the steps of compounding the curable elastomer composition at a temperature within a range from about 38° to about 205° C. for a time sufficient to allow dispersal of the unsaturated carboxylic metal salt, the organic peroxide curing agent, and phenothiazine throughout the elastomer, and heating the compounded curable elastomer composition to a temperature within a range from about 150° to about 205° C. for a time sufficient to cure the curable elastomeric composition.

The unsaturated carboxylic metal salt enhances the rate of curing of the curable elastomeric composition during the curing step, and enhances the cross-link density of the resulting cured elastomeric composition. The phenothiazine retards the onset of curing of the curable elastomeric composition during the compounding step and during formation of the elastomer into a desirable shape by inhibiting free radical formation by the peroxide curing agent and the unsaturated carboxylic metal salt. The combination of the unsaturated carboxylic metal salt, the organic peroxide curing agent, and the phenothiazine with the elastomer results in efficient curing without precure and a cured elastomer that is hard and strong.

Accordingly, an object of the present invention is to provide an improved elastomer composition.

Another object of the present invention is to provide an improved curing system for elastomers.

Still another object of the present invention is the provide a curing system for elastomers that is efficient and without precure or scorch and produces a hard and strong rubber composition.

Other objects, features and advantages of the present invention will become apparent from the following detailed description, and claims.

DETAILED DESCRIPTION OF THE INVENTION

As summarized above, the present invention encompasses a curable elastomeric composition, a method for curing the curable elastomeric composition with precure inhibition, and the resulting cured elastomer. Generally described, the curable elastomeric composition comprises an elastomer, an unsaturated carboxylic metal salt, an organic peroxide curing agent, and phenothiazine. The curable elastomer composition comprises the steps of compounding the curable elastomer composition at a temperature within a range from about 38° to about 130° C. for time sufficient to disperse the unsaturated carboxylic metal salt, the organic peroxide curing agent, and phenothiazine throughout the elastomer, and heating the compounded curable elastomer composition to a temperature within a range from about 150° to about 205° C. for a time sufficient to cure the curable elastomer composition.

Desirably, the elastomer is a high viscosity elastomer such as nitrile rubber, EPDM, or EVA. Nitrile rubber is also known as nitrile butadiene rubber and is a synthetic rubber made by random copolymerization of acrylonitrile with butadiene by free radical catalysis. The nitrile rubber can be hydrogenated or unhydrogenated, but for applications where low chemical reactivity is desired, hydrogenated nitrile rubber is preferred. In hydrogenated nitrile rubber, a major portion of the carbon-carbon double bonds has been hydrogenated. Desirably, the residual carbon-carbon double bond content of the nitrile rubber is less than about 5 mole percent.

The unsaturated carboxylic metal salt is desirably present in the curable elastomeric composition in an amount from about 5 to about 85 parts per 100 parts elastomer. The unsaturated carboxylic metal salt is a polyfunctional monomer reactive coagent that enhances the rate of curing of the elastomeric composition during the curing step and produces a cured elastomer with enhanced physical properties. The unsaturated carboxylic metal salt also enhances the curing of the elastomer composition primarily by increasing the crosslink density of the elastomer. This results in more efficient curing and produces a harder and stronger rubber product.

Suitable unsaturated carboxylic metal salts include zinc, magnesium, aluminum, calcium, and lithium acrylates, zinc dimethacrylates, and metal salts of methacrylic acid, maleic acid, and itaconic acid, but the preferred unsaturated carboxylic metal salt is zinc diacrylate. Zinc diacrylate is particularly desirable for use in curing high viscosity elastomers such as nitrile rubber, EPDM, and EVA. Although zinc diacrylate provides for enhanced curing of elastomers in the presence of peroxide curing agents, zinc diacrylate can form free radicals prematurely. The addition of phenothiazine inhibits this radical formation during compounding and formation of elastomers.

The organic peroxide curing agent is desirably present in the curable elastomeric composition in an amount effective to produce free radicals during the curing step. Preferably, the organic peroxide curing agent is present in the curable elastomeric composition in an amount from about 1 to about 10 parts per 100 parts elastomer. Organic peroxides suitable for use in the present invention include dicumyl peroxide; ethyl-3,3-di(t-butylperoxy)-butyrate; t-butyl-cumyl peroxide; t-butylperbenzoate; t-butyl peroxide; t-butylperoxy (2-ethyl hexanoate); 2,5-dimethyl-2,5(t-butyl peroxy)hexane; 1,1-ditertiary peroxy-3,3,5-trimethyl cyclohexane; 4,4-di t-butyl peroxy n-butyl valerate; alpha, alpha-bis(t-butyl peroxy)-diisopropyl benzene; and 1,1-di t-butyl peroxy-3,3, 5-(t-butyl peroxy)hexane. A preferred organic peroxide agent is 2,5-dimethyl-2,5-di(t-butylperoxy)hexyne- 3, calcium carbonate.

The phenothiazine is present in an amount effective to retard the onset of curing of the curable elastomeric composition during compounding of the curable elastomeric composition at a temperature within the range from about 38° to about 130° C. for a time sufficient to disperse the unsaturated carboxylic metal salt, the organic peroxide curing agent, and the phenothiazine throughout the composition. Desirably, the phenothiazine is present in an amount effective to retard the onset of curing of the elastomer composition through compounding and formation of the elastomer composition into a shape, such as by injection molding, or the like. Preferably, the phenothiazine is present in an amount from about 0.025 to about 2 parts per 100 parts nitrile rubber.

The composition of this invention may also include other additives such as processing agents, inert fillers, plasticizers, antioxidants, and the like. Suitable processing agents include zinc monomethylmethacrylate (ZMA) which is basic and is formed from the reaction of zinc oxide with methacrylic acid at a one-to-one molar ratio. Here, ZMA is added to the elastomer composition for further precure inhibition. It is believed that the basicity of ZMA neutralizes or reduces the undesired acid species which are radicals that may otherwise cause precuring of the rubber composition during the compounding process. Other suitable processing agents include: metal fatty acid salts such as zinc, calcium, magnesium, and aluminum stearate, palmitate, oleate, laurate, and pellergonate; fatty acid esters such as methyl oleate; and waxes such as montan wax and carnuba wax.

Suitable inert fillers include carbon black, silica, silicates, zinc oxide, cork, titania, cotton floc, cellulose floc, leather fiber, plastic fiber, plastic flower, leather flower, fibrous fillers such as asbestos, glass and synthetic fibers, metal oxides and carbonates, and talc. The amount of the inert filler is dictated by its type and the ultimate intended use of the elastomer composition as is understood by those skilled in the art.

In the production of articles of manufacture from the curable rubber compositions of the invention, the reactant ingredients are normally intimately admixed, using for example, conventional rubber mixing rolls or a Banbury mixer, until the composition is uniform. The temperature of the compounding operation should be below temperatures at which the curing reaction commences but at a temperature sufficiently high so that the viscosity of the composition allows for rapid and efficient compounding of the composition. In general, normal rubber milling practice is employed.

After compounding, the curable elastomer composition of this invention is extruded into desirable shapes by conventional techniques including compression or injection molding. The molding temperatures may vary depending on the ingredients of the particular composition used, and may, for example, range from between about 40° and about 135° C. After extrusion, the composition is cured at a temperature within the range from about 150° about 205° C. for a time period from about 5 to about 30 minutes.

Nitrile rubber is a chemically resistant elastomer that is used in many applications in which the elastomer is exposed to chemicals. Nitrile rubber products prepared according to the present invention exhibit superior physical properties in the form of tensile strength, modulus, and abrasion resistance. Thus, the nitrile rubber compositions of the this invention may be used to make drive belts, roll covers, high pressure hoses, O-rings, gaskets, and the like.

The following examples illustrate the embodiments of this invention and are designed to teach one skilled in the art how to carry out the present invention. In the following examples, most of the ingredients of each elastomer composition are identified by trade names or acronyms and are defined as follows:

1. THERBAN 1767 HNBR is hydrogenated nitrile butadiene rubber available from polysar Rubber Corp. of Sarnia, Canada. THERBAN 1767 has a carbon-carbon double bond content of less than 5 mole %.
2. ZDA is zinc diacrylate available from Rockland React-Rite, Inc. of Rockmart, Ga.
3. Di-2-ethyl hexyl phthalate plasticizer is available from Exxon of Houston, Tex.
4. VULCUP 40KE is an organic curing agent having the formula alpha,alpha'-bis(t-butylperoxy)diisopropyl benzene and is available from Hercules, Inc. of Wilmington, Del.
5. VAROX 130 XL is an organic peroxide curing agent having the formula 2,5-dimethyl-2,5-di(t-butylperoxy)hexyne-3, calcium carbonate and is available from RT Vanderbilt Company of Norwalk, Conn.
6. ZMA is a zinc monomethyl methacrylate Rockland React-Rite, Inc. of Rockmart, Ga.

COMPARATIVE EXAMPLE 1, EXAMPLES 1A–C

Four nitrile rubber compositions were compounded and cured and are identified in Table 1 as Comparative Example 1 and Examples 1A–C. Table 1 shows the ingredients of each composition in parts per hundred nitrile rubber and shows test data for each example including Mooney viscosity (Tl+4), Scorch Retardation (TS(5)), and physical properties of the resulting elastomers. Comparative Example 1 had no phenothiazine scorch retarder. First, for each of the examples, an initial masterbatch of the THERBAN 1767, ZDA, and di-2-ethyl hexyl phthalate plasticizer was compounded on a Banbury mixer at 100° C. for a period of 10 minutes. Then, for each of Examples 1A–1C, the VULCUP 40KE, phenothiazine, and ZMA were added to the initial masterbatch and compounded at 50° C. on a mill roll for a period of 12 minutes to form a complete masterbatch. Samples of the masterbatches were then subjected to Mooney scorch (TS(5)) measurements which were made on a Tech Pro Visc Tech Mooney viscometer at 135° C. in accordance with ASTM D1646-81. The Tech Pro Visc Tech Mooney viscometer is available from Tech Pro of Cuyahoga Falls, Ohio. Samples of the masterbatches were also cured at 176° C. for a period of 15 minutes and the tensile strength, 100% modulus, and elongation of the cured elastomers were measured according to ASTM D412-92.

As can be seen from Table 1, the mooney scorch retardation times of the elastomer compositions of Examples 1A–1C were much greater than that of the elastomer composition of Comparative Example 1. This shows that the phenothiazine is very effective in this elastomer system for retarding scorch. The cured elastomers from Examples 1A–1C exhibited enhanced tensile strength and elongation over the cured elastomeric composition from Example 1, but had lower 100% modulus values. The elastomer composition of Example 1B comprising both phenothiazine and ZMA had the best attributes.

TABLE 1

| COMPOSITION | Comparative Example 1 | Example 1A | Example 1B | Example 1C |
| --- | --- | --- | --- | --- |
| THERBAN 1767 HNBR | 100 | 100 | 100 | 100 |
| ZDA | 39.8 | 39.8 | 39.8 | 39.8 |
| di-2-ethyl hexyl phthalate Plasticizer | 10 | 10 | 10 | 10 |
| VULCUP 40KE | 6 | 6 | 6 | 6 |
| Phenothiazine | 0 | 0.5 | 0.5 | 1 |
| ZMA | 0 | 0 | 3.5 | 0 |
| Mooney Scorch Retardation TS(5) (minutes) | 6.00 | 15.71 | 14.1 | 18.06 |
| Tensile Strength PSI | 3000 | 3980 | 4920 | 4400 |
| 100% Modulus PSI | 1736 | 1100 | 1106 | 695 |
| Elongation % | 161 | 264 | 301 | 406 |

COMPARATIVE EXAMPLE 2, EXAMPLES 2A AND 2B

Three nitrile rubber compositions were compounded and cured and are identified in Table 2 as Comparative Example 2 and Examples 2A and 2B. Table 2 shows the ingredients of each composition in parts per 100 nitrile rubber and shows test data for each example including Mooney scorch retardation (TS(5)), and physical properties of the resulting elastomers. Comparative Example 1 had no phenothiazine scorch retarder. Examples 2A and 2B both comprised phenothiazine. First, for each of the examples an initial masterbatch consisting of the THERBAN 1767 nitrile rubber, ZDA, and di-2-ethyl hexyl phthalate plasticizer was compounded on a Banbury mixer at 100° C. for a period of 10 minutes. Then, for each of Examples 2A and 2B, the VAROX 130 XL peroxide, phenothiazine, and ZMA (in Example 2B only) were added to the initial masterbatch and compounded on a roll mill for a period of 12 minutes to form a complete masterbatch. Samples of the masterbatches were then subjected to Mooney Scorch (Tl(5)) measurements which were made on a Tech Pro Visc Tech Mooney viscometer as in Examples 1A–1D. Samples of the elastomers were also cured at 175° C. for a period of 15 minutes and the tensile strength, 100% modulus, and elongation of the cured elastomers were measured according to ASTM D412-92.

As can be seen from Table 2, the Mooney scorch retardation data shows that the elastomeric composition of Examples 2A and 2B comprising phenothiazine exhibits much longer scorch retardation time than the elastomeric composition of Comparative Example 2 without phenothiazine. Although the 100% modulus of the compositions from Examples 2A and 2B were somewhat lower than that of the composition of Comparative Example 2, the tensile strength and elongation of Examples 2A and 2B were higher. Again, the elastomeric composition comprising both phenothiazine and ZMA exhibited the best properties.

terbatch formula was as follows: 100 parts of THERBAN 1767 hydrogenated nitrile butadiene rubber, 39.8 parts ZDA, 10 parts di-2-ethyl hexyl phthalate plasticizer, 0.25 parts of phenothiazine, and 5 parts of ZMA. The ingredients of each masterbatch were compounded at 50° C. for a period of 12 minutes and then cured at varying temperatures. The compositions of examples 3A, 3B, and 3C were cured at 190° C. for a period of 15 minutes. The nitrile rubber compositions of Examples 4A, 4B, and 4C were cured at a temperature of 204° C. for a period of 15 minutes, and the nitrile rubber compositions of Examples 5A, 5B, and 5C were cured at a temperature of 232° C. for a period of 15 minutes. The tensile strength, 100% modulus, and elongation of the cured nitrile rubber compositions of the Examples were measured according to ASTM D412-92 and the results are shown in Table 3. The curing temperature range of 190° C. to 204° C. gave the highest tensile strengths and the 6 PHR peroxide level shows the highest tensile strength at each different temperature.

TABLE 3

| CURE TEMP. °C. | 190 | | | 204 | | | 232 | | |
| --- | --- | --- | --- | --- | --- | --- | --- | --- | --- |
| Example | 3A | 3B | 3C | 4A | 4B | 4C | 5A | 5B | 5C |
| Varox 130XL (PHR) | 6 | 7 | 8 | 6 | 7 | 8 | 6 | 7 | 8 |
| Average Tensile Strength | 4360 | 4030 | 3660 | 4610 | 3930 | 3810 | 4240 | 3910 | 3560 |
| 100% Modulus | 1220 | 1463 | 1582 | 1206 | 1346 | 1519 | 1211 | 1342 | 1448 |
| Elongation % | 256 | 210 | 155 | 266 | 216 | 193 | 247 | 215 | 191 |

TABLE 2

| COMPOSITION | Comparative Example 2 | Example 2A | Example 2B |
| --- | --- | --- | --- |
| THERBAN 1767 HNBR | 100 | 100 | 100 |
| ZDA | 39.8 | 39.8 | 39.8 |
| di-2-ethyl hexyl phthalate Plasticizer | 10 | 10 | 10 |
| 130XL | 6 | 6 | 6 |
| Phenothiazine | 0 | 0.5 | 0.25 |
| ZMA | 0 | 0 | 5 |
| Mooney Scorch Retardation TS(5) (minutes) | 18.04 | 33.14 | 30.8 |
| Tensile Strength PS1 | 3650 | 4200 | 4210 |
| 100% Modulus PS1 | 1533 | 1130 | 1421 |
| Elongation % | 189 | 259 | 219 |

EXAMPLE 3A–C, 4A–C, AND 5A–C

Nine nitrile rubber compositions were compounded and cured and are identified in Table 3 as examples 3A, 3B, 3C, 4A, 4B, 4C, 5A, 5B, and 5C. Each nitrile rubber composition had the same recipe except that the level of VAROX 130 XL peroxide was varied as shown in Table 3. The basic mas-

COMPARATIVE EXAMPLE 3, EXAMPLES 6A–6C

Five nitrile rubber compositions were compounded and cured and are identified in Table 4 as Comparative Example 3 and Examples 6A, 6B, and 6C. Table 4 shows the ingredients of each composition in parts per 100 nitrile rubber. Comparative Example 3 had no phenothiazine scorch retardant but Examples 6A–6C each contained phenothiazine.

First, for each example, the ingredients were compounded at a temperature of 100° C. for a period of 10 minutes to form a masterbatch. Then, the cure profile of samples from each example was measured over fifteen minutes on a Monsanto RPA2000 (rubber process analyzer) available from Monsanto of Akron, Ohio, and set at a constant temperature of 175° C., 100CPM frequency, and 0.30° strain. The measurements made with the rubber processor analyzer are shown in Table 4 and include the maximum cure torque S'(dNm) and incremental torque, T'10, T'50, and T'90, corresponding to 10%, 50%, and 90% rubber cure, respectively. As can be seen from Table 4, the torque is somewhat reduced by the addition of phenothiazine; however, the torque is well within commercially acceptable values.

TABLE 4

| COMPOSITION | Comparative Example 3 | Example 6A | Example 6B | Example 6C |
| --- | --- | --- | --- | --- |
| THERBAN 1767 HNBR | 100 | 100 | 100 | 100 |
| ZDA | 39.8 | 39.8 | 39.8 | 39.8 |
| di-2-ethyl hexyl phthalate Plasticizer | 10 | 10 | 10 | 10 |
| VULCUP 40KE | 6 | 6 | 6 | 6 |
| Phenothiazine | 0 | 0.5 | 0.5 | 1 |
| ZMA | 0 | 0 | 3.5 | 0 |
| Torque Max 5' (dNm) | 23.52 | 17.56 | 19.15 | 13.56 |

TABLE 4-continued

| COMPOSITION | Comparative Example 3 | Example 6A | Example 6B | Example 6C |
|---|---|---|---|---|
| T'10 | 0.29 | 0.41 | 0.40 | 0.47 |
| T'50 | 0.58 | 0.90 | 0.88 | 1.23 |
| T'90 | 4.73 | 6.08 | 6.14 | 7.05 |

COMPARATIVE EXAMPLE 4, EXAMPLES 7A, 7B, and 7C

Five nitrile rubber compositions were compounded and cured and are identified in Table 5 as Comparative Example 4 and Examples 7A, 7B, and 7C. Table 5 shows the ingredients of each composition in parts per 100 nitrile rubber. Comparative Example 4 had no phenothiazine scorch retardant but Examples 7A–7C each contained phenothiazine.

First, for each example, the ingredients were compounded at a temperature of 50° C. for a period of 10 minutes to form a masterbatch. Then, the cure profile of samples from each example was measured over fifteen minutes on a Monsanto RPA2000 (rubber process analyzer) available from Monsanto of Akron, Ohio, set at a constant temperature of 190° C., 100CPM frequency, and 0.30° strain. The measurements made with the rubber processor analyzer are shown in Table 5 and include the maximum cure Torque S'(dNm) and incremental torque, T'10, T'50, and T'90, corresponding to 10%, 50%, and 90% rubber cure, respectively. As can be seen from Table 5, the torque is somewhat reduced by the addition of phenothiazine; however, the torque is well within commercially acceptable values.

TABLE 5

| COMPOSITION | Comparative Example 4 | Example 7A | Example 7B | Example 7C |
|---|---|---|---|---|
| THERBAN 1767 HNBR | 100 | 100 | 100 | 100 |
| ZDA | 39.8 | 39.8 | 39.8 | 39.8 |
| di-2-ethyl hexyl phthalate Plasticizer | 10 | 10 | 10 | 10 |
| VAROX 130 XL | 6 | 6 | 6 | 6 |
| Phenothiazine | 0 | 0.5 | 0.25 | 0.25 |
| ZMA | 0 | 0 | 5 | 0 |
| Torque Max 5' (dNm) | 24.07 | 18.1 | 19.77 | 20.94 |
| T'10 (dNm) | 2.80 | 2.08 | 2.24 | 2.42 |
| T'50 (dNm) | 12.26 | 9.20 | 10.03 | 10.65 |
| T'90 (dNm) | 21.70 | 16.32 | 17.82 | 18.88 |

It should be understood that the foregoing relates to particular embodiments of this invention, and that numerous changes may be made therein without departing from the spirit and scope of the invention as defined by the following claims.

We claim:

1. Curable elastomer composition comprising:

an elastomer selected from the group consisting of nitrile rubber, ethylene-propylene diene copolymer, and ethylene-vinyl acetate copolymer;

zinc diacrylate;

an organic peroxide curing agent; and phenothiazine.

2. Composition as in claim 1 wherein:

the zinc diacrylate is present in an amount effective to enhance the rate of curing of the composition and the cross-link density of the composition when the composition is cured;

the organic peroxide curing agent is present in an amount effective to produce free radicals during curing of the composition; and the phenothiazine is present in an amount effective to retard the onset of curing of the composition during compounding of the composition at a temperature within the range from about 38° to about 130° C., for a time sufficient to allow dispersal of the zinc diacrylate, the organic peroxide curing agent, and the phenothiazine throughout the composition.

3. Composition as in claim 1 wherein;

the zinc diacrylate is present in an amount from about 5 to about 85 parts per 100 parts elastomer;

the organic peroxide curing agent is present in an amount from about 1 to about 10 parts per 100 parts elastomer; and the phenothiazine is present in an amount from about 0.025 to about 2 parts per 100 parts elastomer.

4. Composition as in claim 1 wherein the nitrile rubber is hydrogenated.

5. Composition as in claim 4 wherein the carbon-carbon double bond content of the nitrile rubber is less than about 5 mole %.

6. Composition as in claim 1 wherein the organic peroxide curing agent comprises a ditertiary alkyl peroxide.

7. Composition as in claim 1 wherein the organic peroxide curing agent comprises 2,5-dimethyl- 2,5-di (t-butylperoxy-)hexyne-3 calcium carbonate.

8. Composition as in claim 3 wherein the organic peroxide curing agent is a ditertiary alkyl peroxide.

9. Composition as in claim 8 wherein the ditertiary alkyl peroxide is 2,5-dimethyl-2,5-di-(t-butylperoxy)hexyne- 3, calcium carbonate.

10. Method for curing an elastomer comprising the steps of:

compounding at a temperature within a range from about 38° to about 130° C. a curable elastomer composition comprising:

an elastomer selected from the group consisting of nitrile rubber, ethylene-propylene diene copolymer, and ethylene-vinyl acetate copolymer;

zinc diacrylate;

an organic peroxide curing agent; and phenothiazine;

for a time sufficient to disperse the zinc diacrylate, the organic peroxide curing agent, and phenothiazine throughout the elastomer; and heating the compounded curable elastomer composition to a temperature within a range from about 150° to about 205° C. for a time sufficient to cure the curable elastomeric composition.

11. Method as in claim 10 wherein:

the zinc diacrylate is present in the curable elastomeric composition in an amount effective to enhance the rate of curing of the curable elastomeric composition during the curing step, and enhance the cross-link density of the resulting cured elastomeric composition;

the organic peroxide curing agent is present in the curable elastomeric composition in an amount effective to produce free radicals during the curing step; and the phenothiazine is present in an amount effective to retard the onset of curing of the curable elastomeric composition during the compounding step.

12. Method as in claim 10 wherein:

the zinc diacrylate is present in the curable elastomeric composition in an amount from about 5 to about 85 parts per 100 parts elastomer;

the organic peroxide curing agent is present in the curable elastomeric composition in an amount from about 1 to about 10 parts per 100 pats elastomer; and the phenothiazine is present in the curable elastomeric composition in an amount from about 0.025 to about 2 parts per 100 parts elastomer.

13. Method as in claim 10 wherein the nitrile rubber is hydrogenated.

14. Method as in claim 13 wherein the carbon-carbon double bond content of the nitrile rubber is less than about 5 mole %.

15. Method as in claim 10 wherein the organic peroxide curing agent comprises a ditertiary alkyl peroxide.

16. Method as in claim 10 wherein the organic peroxide curing agent comprises 2,5-dimethyl-2,5-di(t-butylperoxy)hexyne- 3, calcium carbonate.

17. Method as claim 11 wherein the organic peroxide curing agent is a ditertiary alkyl peroxide.

18. Method as in claim 17 wherein the ditertiary alkyl peroxide is 2,5-dimethyl-2,5-di(t-butylperoxy)hexyne- 3, calcium carbonate.

19. A cured elastomeric composition made according to a process comprising the steps of:

compounding at a temperature within a range from about 38° to about 130° C. a curable elastomer composition comprising:

an elastomer selected from the group consisting of nitrile rubber, ethylene-propylene diene copolymer, and ethylene-vinyl acetate copolymer;;

zinc diacrylate;

an organic peroxide curing agent; and phenothiazine;

for a time sufficient to disperse the zinc diacrylate, the organic peroxide curing agent, and phenothiazine throughout the elastomer; and heating the compounded curable elastomer composition to a temperature within a range from about 150° to about 205° C. for a time sufficient to cure the curable elastomeric composition.

20. Composition as in claim 19 wherein:

the zinc diacrylate is present in the curable elastomeric composition in an amount effective to enhance the rate of curing of the curable elastomeric composition during the curing step, and enhance the cross-link density of the resulting cured elastomeric composition;

the organic peroxide curing agent is present in the curable elastomeric composition in an amount effective to produce free radicals during the curing step; and the phenothiazine is present in an amount effective to retard the onset of curing of the curable elastomeric composition during the compounding step.

21. Composition as in claim 19 wherein:

the zinc diacrylate is present in the curable elastomeric composition in an amount from about 5 to about 85 parts per 100 parts nitrile rubber;

the organic peroxide curing agent is present in the curable elastomeric composition in an amount from about 1 to about 10 parts per 100 parts nitrile rubber; and the phenothiazine is present in the curable elastomeric composition in an amount from about 0.025 to about 2 parts per 100 parts nitrile rubber.

22. Composition as in claim 19 wherein the nitrile rubber is hydrogenated.

23. Composition as in claim, 22 wherein the carbon-carbon double bond content of the nitrile rubber is less than about 5 mole %.

24. Composition as in claim 19 wherein the organic peroxide curing agent comprises a ditertiary alkyl peroxide.

25. Composition as in claim 19 wherein the organic peroxide curing agent comprises 2,5-dimethyl- 2,5-di(t-butylperoxy)hexyne-3, calcium carbonate.

26. Method as claim 20 wherein the organic peroxide curing agent is a ditertiary alkyl peroxide.

27. Composition as in claim 26 wherein the elastomer is nitrile rubber.

28. Method as in claim 26 wherein the ditertiary alkyl peroxide is 2,5-dimethyl-2,5-di(t-butylperoxy)hexyne- 3, calcium carbonate.

29. Composition as in claim 28 wherein the elastomer is nitrile rubber.

* * * * *